Patented May 16, 1933

1,909,133

UNITED STATES PATENT OFFICE

ALEXANDER SILVERMAN AND CARL J. ENGELDER, OF PITTSBURGH, AND MANUEL BLUMER, OF INGRAM, PENNSYLVANIA

METHOD OF MAKING CATALYSTS

No Drawing.   Application filed December 24, 1930.   Serial No. 504,650.

This invention relates to a catalyst and to a process of making the same and particularly to a catalyst adapted to oxidize carbon monoxide to carbon dioxide.

We are aware that various catalysts for the same purpose are already known, but such catalysts have certain well recognized defects and disadvantages. One such is the inability of the catalyst to act efficiently at relatively low temperatures. Another is the sensitivity of the catalyst to water, thereby necessitating the thorough drying of both the catalyst and the material acted upon. A further disadvantage lay in the relative effectiveness of the catalyst, that is, prior catalysts have effective action upon only a relatively small amount of material per unit of catalyst. One of the important disadvantages is the relative expensiveness of these catalysts and the fact that they have to be revivified at relatively high temperatures.

In contradistinction to the above, we have invented a new catalytic mass, which is simple in composition, which is cheap and easy to make, which is insensitive to water vapor in gas mixtures containing upward of 2% of carbon monoxide and entirely insensitive to water vapor in gas mixtures at 100° C. or higher, which acts effectively in the presence of water vapor even up to the point of saturation of the material acted upon, which acts efficiently at relatively low temperatures and which can be revivified by only a moderate heat treatment.

The objects of the invention indicated by the preceding paragraph as well as other objects and advantages which will be apparent hereinafter are accomplished by means of the catalytic mass now to be described and prepared substantially as hereinafter set forth.

The catalyst or catalytic mass which we have invented consists of cobaltic oxide and ferric oxide and substantially only these compounds. While the proportions thereof may naturally be somewhat varied according to the particular conditions and circumstances present at any particular time, we prefer to combine them in the proportions of approximately 30% cobaltic oxide and 70% ferric oxide and we have found that such a mass of substantially these proportions is exceedingly active and efficient.

The fact that the catalytic mass contains no elements such as manganese which are sensitive to water vapor enables the mass to be used in the presence of water vapor, even in fact if the material subjected to the catalytic action is saturated with water vapor, and this, so far as we are aware, is entirely new and novel with our catalyst.

In addition to the relative insensitivity to water, we have found further that our catalyst is at least three or four times as active as any known catalyst and by this we mean that a given amount of our catalyst will catalyze three or four times as much material as other catalysts with the same or better results than those obtained therefrom. A further important characteristic of our catalyst resides in the fact that to revivify it, it need only be heated to about 100° C., instead of 225° to 250° C. which is about the minimum of the prior art catalysts.

The method of preparing our catalyst is, of course, somewhat flexible in operation and we are not limited to the precise chemicals or steps hereinafter enumerated. We have, however, discovered that the method used by us in making our catalyst results invariably in the catalyst above mentioned.

In one satisfactory method of preparing the catalyst, we dissolve water soluble cobalt and iron salts in suitable or desired proportions in water and the temperature of the water has been found to be immaterial, although we prefer relatively cool or cold water. We next bubble chlorine gas in any suitable manner through the above solution until it is saturated and we thereupon discontinue the chlorine treatment and add sodium hydroxide or other suitable base in slight excess, that is, until the solution has become slightly basic in character. A precipitate is formed by the above treatment and this precipitate we wash first by decantation and then with distilled water until the wash water is free from chloride, as indicated by the usual or any suitable test. We next, preferably filter by suction so as to drain most of the water from the precipitate and then we dry the precipitate in an electric oven, for example, at a temperature of not over about 110° C. for a suitable length of time and thereafter we granulate the dried precipitate to any suitable or proper size. Finally, we activate the precipitate before using it by heating it in an electric oven for about one to two hours at about 300° C. or until the mass becomes dry and porous preferably in a current containing carbon monoxide and air. This forms the catalyst of the present invention.

We have found that a carbon monoxide-air mixture, containing up to 10% of carbon monoxide and at a temperature of from about −10° C. to 400° C., when passed over a drying agent to remove water vapor and then over our catalyst, the carbon monoxide of the mixture was effectively oxidized. We have further found that a carbon monoxide-air mixture containing up to 10% carbon monoxide, even when saturated with water vapor at room temperature, the carbon monoxide of such mixture is effectively oxidized even at said room temperature which ordinarily is in the neighborhood of about 26° C., as well as at higher temperatures up to about 400° C., when the catalytic mass is at a temperature of about 100° C. or higher.

The carbon monoxide mixture, when passed over our catalyst as above stated, is efficiently oxidized to carbon dioxide and while we have perfected our catalyst for this particular purpose, yet it is apparent to us and to those skilled in this particular field that other and analogous actions may be equally well carried out.

During the preparation of our catalyst we find at one stage therein that a purplish coloration appears which is evidence of the presence of a slight trace of cobaltic ferrate and it may be that this in some way increases the activity of the catalyst.

It is to be understod that the various ingredients used may be varied to suit any given circumstances and such variations, modifications, substitutions or additions are deemed to fall within the spirit and scope of our invention. For example, the choice of the particular cobalt and iron salts is a rather wide one and we are not limited to any particular salt nor are we limited to the use of sodium hydroxide as the reagent to render the chlorinated solution basic. Other alkalies or bases may be used equally well. All these matters are those appreciated by the chemists.

What we claim as new and desire to secure by Letters Patent is:

1. The steps in the method of making a catalyst including preparing a water solution of water soluble cobalt and iron salts, chlorinating the solution, alkalinizing the solution, recovering the resultant precipitate and activating the same by heating to about 300° C.

2. The steps in the preparation of a catalyst consisting in chlorinating a water solution of water soluble cobalt and iron salts, rendering the same basic with a slight excess of sodium hydroxide, recovering the resultant precipitate, purifying by washing with water and activating at about 300° C.

3. The steps in the preparation of a catalyst consisting in chlorinating a water solution of water soluble cobalt and iron salts, rendering the same basic with a slight excess of sodium hydroxide, recovering the resultant precipitate, purifying it by washing it free of chloride, drying, granulating to size and activating it by heating to about 300° C.

4. The steps in the preparation of a catalyst consisting in chlorinating a water solution of water soluble cobalt and iron salts, rendering the same basic with a slight excess of sodium hydroxide, recovering the resultant precipitate, purifying it by washing it free of chloride, drying, granulating to size and activating it by drying at about 300° C. for about one to two hours.

In testimony whereof, we have hereunto set our names this 22nd day of December, 1930.

ALEXANDER SILVERMAN.
CARL J. ENGELDER.
MANUEL BLUMER.